United States Patent
Longobardi et al.

(10) Patent No.: US 8,392,513 B2
(45) Date of Patent: Mar. 5, 2013

(54) REDUCING EMAIL SIZE BY USING A LOCAL ARCHIVE OF EMAIL COMPONENTS

(75) Inventors: Giuseppe Longobardi, Castellammare di Stabia (IT); Scot MacLellan, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1022 days.

(21) Appl. No.: 12/348,501

(22) Filed: Jan. 5, 2009

(65) Prior Publication Data
US 2010/0174761 A1 Jul. 8, 2010

(51) Int. Cl.
*G06F 15/16* (2006.01)
(52) U.S. Cl. .................... 709/206; 709/207; 709/225
(58) Field of Classification Search ............. 709/206, 709/207, 225
See application file for complete search history.

(56) References Cited

U.S. PATENT DOCUMENTS

| 7,389,422 B2 * | 6/2008 | Banerjee et al. | 713/176 |
| 2006/0206569 A1 * | 9/2006 | Heidloff et al. | 709/206 |
| 2010/0077301 A1 * | 3/2010 | Bodnick et al. | 715/274 |

* cited by examiner

*Primary Examiner* — Adnan Mirza
(74) *Attorney, Agent, or Firm* — Stephen J. Walder, Jr.; Jeffrey S. LaBouv

(57) ABSTRACT

A mechanism for reducing electronic mail (email) sizes by using a local archive of email components is provided. The mechanism receives the email file, the email file specifying a sender identifier of a sender of the email file, a recipient identifier of a recipient of the email file, and common component information for a common component included in the email file, the common component being a component of the email file that is common amongst a plurality of email files sent from the sender. The mechanism identifies the common component of the email file and determines whether to remove the common component from the email file before forwarding the email file to the recipient based on at least the sender identifier. Based on the determination, the common component is either removed or kept in the email file that is subsequently transmitted to the recipient computer.

20 Claims, 4 Drawing Sheets

REDUCING EMAIL SIZE BY USING A LOCAL ARCHIVE OF EMAIL COMPONENTS

BACKGROUND

The present application relates generally to an improved data processing apparatus and method and more specifically to a mechanism for reducing the size of electronic mail (email) files by using a local archive of email components such that common email components may be removed from the email file.

With the increasing popularity of computers in today's society, paper communications are becoming scarcer and are being replaced by digital communications, such as electronic mail (email). In addition, with the increased popularity of digital communications, and especially email communications, the size of the digital files, i.e. email files, that comprise the communication are increasing. For example, emails allow for the attachment of multimedia files, various graphical and textual qualities of the communication, e.g., stationeries, various fonts, images, logos, and the like. All of these various elements of an email communication add to the size of the email file that is transmitted from the sender to the receiver computing device.

The increased size of the email files, along with the increased popularity and use of email for communications, causes a reduction in the available bandwidth of the network communication links used to transmit the email files from sender to receiver. In addition, the increased size of the email files requires additional storage space at the sender, intermediate email server, and receiver computing systems to store the email file.

SUMMARY

In one illustrative embodiment, a method, in a data processing system, is provided for processing an electronic mail (email) file. The method comprises receiving the email file, the email file specifying a sender identifier of a sender of the email file, a recipient identifier of a recipient of the email file, and common component information for a common component included in the email file, the common component being a component of the email file that is common amongst a plurality of email files sent from the sender. The method further comprises identifying the common component of the email file and determining whether to remove the common component from the email file before forwarding the email file to the recipient based on at least the sender identifier. Moreover, the method comprises removing the common component from the email file to thereby generate a modified email file in response to a determination to remove the common component. In addition, the method comprises forwarding one of the email file or the modified email file to a recipient computer associated with the recipient identifier in response to results of the determination whether to remove the common component.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
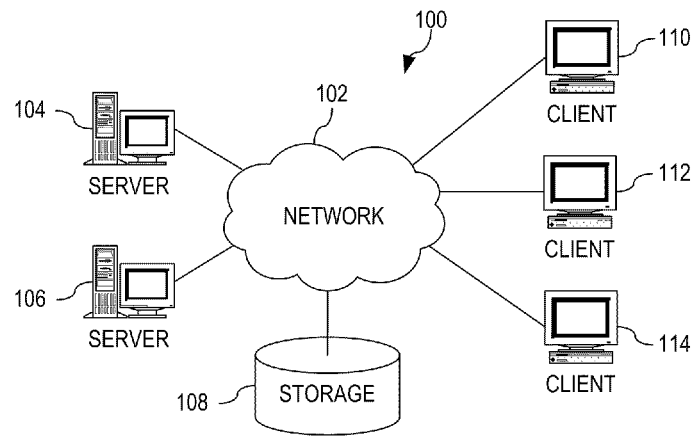
FIG. 1 is an example diagram of a distributed data processing environment in which aspects of the illustrative embodiments may be implemented.

The illustrative embodiments provide a mechanism for reducing the size of electronic mail (email) files by using a local archive of email components. The mechanisms of the illustrative embodiment operate to reduce the size of the email file, which in turn reduces the size of network traffic over network communication links and reduces the storage space needs to store the email file, without reducing or eliminating the information content of the email file that is output to the recipient of the email file.

The mechanisms of the illustrative embodiments achieve these results by stripping common components, e.g., signatures, stationeries, logos, graphics, etc., of an email file that have already been received by the intended recipient prior to transmitting the email file, or prior to retransmission from the email server to the recipient computing device. The recipient computing device stores a local archive of such common components and associates them with a particular sender. Thus, when an email file is received from the particular sender, the email having had its common components stripped away, the common components of the email file may be retrieved from the recipient's local archive and incorporated into the output of the email file when necessary. This permits the size of the email file to be reduced by the size of the common components for both transmission and storage of the email file.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Because the mechanisms of the illustrative embodiments are directed to digital communications between at least two computing devices, the illustrative embodiments are especially well suited for implementation in a distributed data processing environment. In order to provide a context for the description of the specific elements and functionality of the illustrative embodiments, FIGS. 1 and 2 are provided hereafter as example environments in which aspects of the illustrative embodiments may be implemented.

Figure 2:
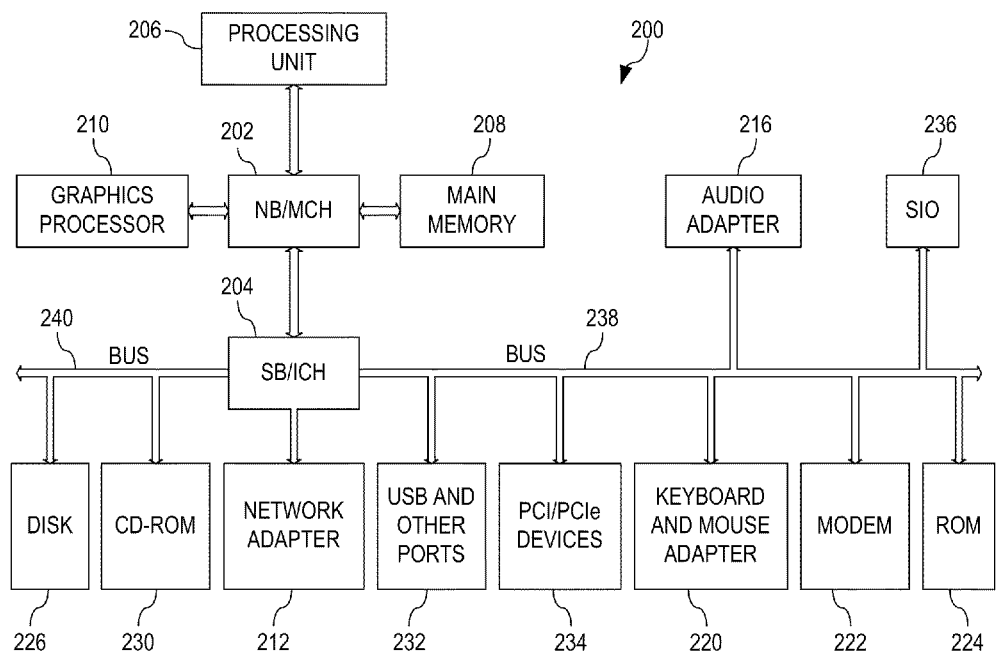
FIG. 2 is an example block diagram of a data processing system in which aspects of the illustrative embodiments may be implemented.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 or a server 106 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2.

As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Referring again to FIG. 1, client computing device 110 may be a sender of email communications to client computing device 112 which operates as a receiver of email communications. Of course both client computing devices 110 and 112 may operate as both sender and receiver of email communications, but for purposes of the present description it will be assumed that client 110 is the sender computer 110 and client 112 is the receiver computer 112. The server 106 may operate as an email server through which email communications are routed between the sender computer 110 and receiver computer 112. Typically, a user of an email client application running on the sender computer 110 composes an email message, along with all of its attachments, and transmits the resulting email file to the email server 106. The email server 106 performs its processing on the email file to determine how to route the email file to the recipient identified in the email file and then re-transmits the email file to an email server, such as server 104, associated with the recipient. The receiver computer 112 then retrieves the email file from their associated email server 104 and stores it locally on the receiver computer 112 for presentation to the user of the receiver computer 112. For simplicity, it will be assumed for purposes of this description that both the sender and receiver computers 110 and 112 use the same email server 106. However, it should be readily apparent to those of ordinary skill in the art in view of the present description how the mechanisms of the illustrative embodiments extend to situations in which recipients utilize different email servers from that of the sender.

The mechanisms of the illustrative embodiments operate to reduce the size of the email files transmitted across the network 102 from at least one of the sender computer 110 to the email server 106 or the email server 106 to the receiver computer 112. The size of the emails is reduced by stripping off or otherwise not including in the email file, standard common components of the email file that are reused by the user of the sender computer 110 when composing emails and thus, are consistent among a plurality of email files transmitted by the sender computer 110. The stripping off of these common components of the email file may be done at the sender computer 110 or at the email server 106, for example.

An email file is logically composed of different parts including the letter head, the body, the signature, the stationery, and the like. The letter head comprises the information regarding the sender email address, the recipient email address(es), the subject of the email message, any attachments to the email message, and the like. The body of the email file comprises the text and graphics that define the actual message that is being sent by the sender to the recipient(s). The body of the email may comprise different characteristics including font type, font size, font effects (boldface, underlining, etc.), and the like. The stationery is a background of the email message and comprises various characteristics including graphical colors, textures, images, and the like. The stationery is used to provide a visual effect of the email.

The signature field is a field that, for a specific sender, is almost always the same and is seldom changed. The information content of the signature field is very low in instances where the sender, i.e. the composer of the email, has already communicated by email with the recipient, i.e. the user of the receiver computer 112 that receives the email file. However, for recipients that have not been previously communicated with by the sender, the signature field may contain very important information that is of value to the recipient.

From one email to the next, the letter head information and body information typically changes. However, for the same sender, the stationery and signature typically do not change very often or at least are reused frequently with subsequent email messages. These components of an email file that are frequently reused or changed infrequently are considered to be the common components of the sender's email files that may be stripped off or not included in the email file by the mechanisms of the illustrative embodiments. For purposes of illustration, the following examples will consider the signature as the common component that is stripped off or otherwise not included in the email files by the mechanisms of the illustrative embodiments. However, it should be appreciated that the mechanisms as described hereafter may be applied to other common components, such as the stationery and the like, without departing from the spirit and scope of the illustrative embodiments. Moreover, the stripping off or non-inclusion of common components by the mechanisms of the illustrative embodiments may be applied to a plurality of common components so as to minimize the size of the email files as much as possible without losing information content of the email files.

Using the signature of an email as an example, a user of the sender computer 110 may compose an email message using an email client application, such as Lotus Notes™ available from International Business Machines Corporation of Armonk, N.Y., Microsoft Outlook™ available from Microsoft Corporation, or the like. As is generally known in the art, such email client applications have functionality for allowing the user to select stationery for the email message, automatically inserting a signature, receiving user input specifying recipients of the email message, automatically inserting the sender's email address, and the like. Typically, the user may specify the signature, stationery, and other common components of the email messages that they compose in preference settings of the email client application through one or more menus, dialog interfaces, and the like provided by the email client application.

Once the email message is composed, the email file corresponding to the email message is transmitted from the sender computer 110 to the email server 106. In this illustrative embodiment, the stripping or non-inclusion of common components is performed at the email server 106. However, it should be appreciated that such operations may also be performed at the sender computer 110 as will be discussed hereafter.

The email server 106 receives the email file and analyzes the email file to determine the sender, the recipient(s), and the content of the common components of the email file. Based on the identification of the sender and the recipient(s), the email server 106 determines if the recipient(s) have previously received email files from the sender. A history database may be used to make such a determination as detailed hereafter. The history database may store information regarding which recipient(s) the sender has sent emails to in the past and identifiers of the common components that were present in the most recent email that was previously sent to those recipients. For example, version numbers or other identifiers, e.g., a hash value resulting from the application of a hash function on the contents of the common components, or the like, may be associated with these common components.

For those recipient(s) that have previously received email files from the sender, the version numbers, hash values, or the like, of the common components in the current email file may be compared to the version number, hash value, etc. of the most recently received previous email file for those particular recipients. If there is a match, then the common components may be stripped off and not included in the email file forwarded to the receiver computer 112. If there is a mismatch, or if the recipient has not previously received an email file from the sender, then the common components for which there is a mismatch may be included in the forwarded email file.

In the case of a mismatch, an entry in the history database may be created or updated to specify the sender, recipient, and the version number, hash value, etc., of the common components of the current email for which there was a mismatch or no entry present in the history database. Thus, the history database may be dynamically updated when common components are changed by the sender or when the sender transmits an email file to a new recipient.

When stripping off the common components of the email file, information may be included in the header of the email file to specify that particular common components have been stripped off. For example, a bit may be set to indicate that the signature has been stripped off. Similarly, another bit may be set to indicate that the stationery information has been stripped off. A series of bits may be provided, one bit for each common component that may be potentially stripped off or otherwise not included in the email file, to thereby provide a bitmap identifying which common components of the email file have been stripped off or not included. Of course, other mechanisms for storing in the email file an indication of what common components have been removed, stripped off, or otherwise not included may be used without departing from the spirit and scope of the illustrative embodiments.

Furthermore, in some illustrative embodiments, identifiers of whether common components have been stripped off may not be included in the forwarded email file. Rather, the receiver computer 112 may simply insert common components from its local archive where none are specified in the forwarded email file, based on an identification of the sender.

At the receiver computer 112, the email client application of the receiver computer 112 receives the forwarded email file from the email server 106 and analyzes it to determine if common components have been stripped off of the email file or otherwise not included. As mentioned above, this determination may be made by looking at a bitmap or other identifier in header information of the email file that specifies whether common components, and which common components, have been stripped off of the email file. Alternatively, this determination may be simply a check to see if particular common components of an email file are even specified or not in the email file.

For those common components that are not present in the forwarded email file, email client application may perform a lookup in its local archive as to whether such common components have been previously used, in previously received email files, by the sender of the forwarded email file. For example, if the sender has previously sent an email file to the receiver computer 112 in which the forwarded email file included a particular signature, that signature may be stored in the local archive of the receiver computer 112 and associated with the sender identifier, e.g., the sender's email address. This signature may then later be retrieved from the local archive, in the event that a signature is not specified in a received email file from the sender, and inserted into the received email file when presenting the email message corresponding to the email file to a user of the receiver computer 112. While this signature, or other common component, is inserted during presentation of the email message, in one illustrative embodiment, in order to minimize storage requirements for the email files received by the receiver computer 112, it is not in fact maintained as part of the email file and the email file is stored without the common component on the receiver computer 112.

In the event that the received email file has common components specified in the email file, these common components may be used as a basis for updating the local archive at the receiver computer 112. In one illustrative embodiment, any time a new email file is received from a sender, the common components specified in the email file are always used to replace any older version of the common components specified in an entry in the local archive or the generate a new entry in the local archive if one does not already exist for that sender. In another illustrative embodiment, to accommodate for the possibility that common component information may be forwarded with the email file unintentionally, versioning of the common components may be used to identify which version of the common component is the most recently used version and the one that should be maintained in the local archive of the receiver computer 112. A comparison of versions of the common components between the received email file and the common component specified in the local archive may be performed to determine whether the local archive needs to be updated or not.

Thus, the illustrative embodiments provide mechanisms for reducing the size of email files so as to reduce storage requirements and network traffic. The mechanisms of the illustrative embodiments achieve these results by stripping off common components before transmitting email files and using a local archive at the recipient to replace such common components. As a result, the amount of data that must be transmitted is reduced. Moreover, since the common components only need to be stored once at the receiver computer 112, rather than multiple times with each received email file from a particular sender, the size of the storage required to store the email files is reduced. This reduction may be small in cases where such common components have only text, but may be much larger in cases where graphics, images, and the like, e.g., logos, pictures, etc., are utilized to provide such common components.

Figure 3:
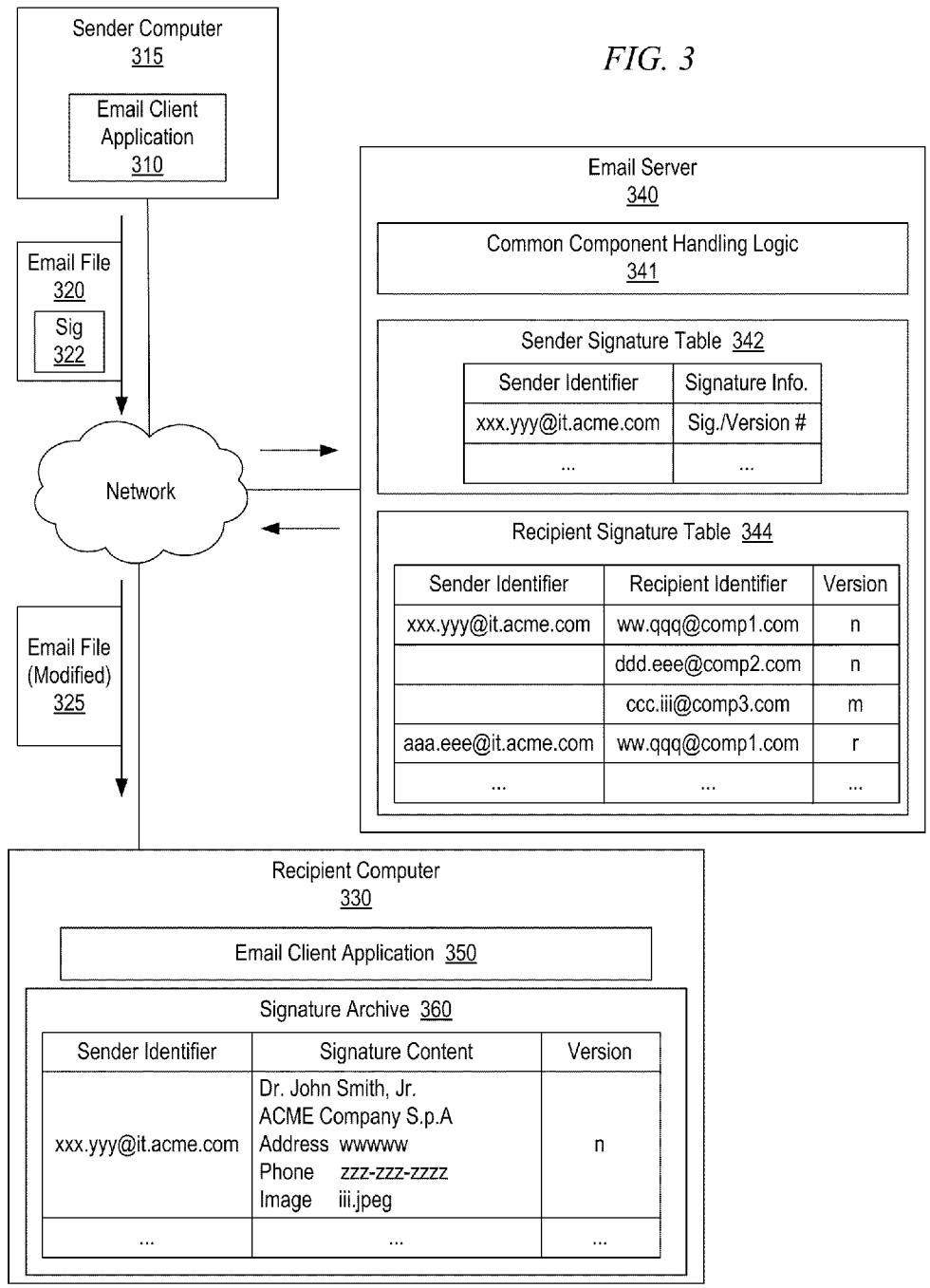
FIG. 3 is an example block diagram illustrating an example operation of the primary operational mechanisms of one illustrative embodiment.

FIG. 3 is an example block diagram illustrating an example operation of the primary operational mechanisms of one illustrative embodiment. It should be appreciated that, unless otherwise indicated in the following description, the operations of the email server 340 with regard to handling common components of email files are performed by the common component handling logic 341, which may be implemented in hardware, software, or any combination of hardware and software, using the data stored in data structures 342 and 344 in the manner described hereafter. As shown in FIG. 3, an email client application 310 on a sender computer 315 is used to compose an email message 320 having a signature 322 that is inserted into the email message 320 by the email client application 310 in accordance with preferences established by the user of the email client application 310. Moreover, in composing the email message, the user specifies, such as in a "To" field of the user interface used to compose email messages, that a recipient associated with the receiver computer 330 is an intended recipient of the composed email message. The user then selects a "send" user interface element to transmit the email message to the email server 340.

In this illustrative embodiment, the email file 320, including the common components, such as the signature 322, is sent to the email server 340 intact, i.e. the common components are not stripped off or prevented from being included in the email file 320 by the client email application on the sender computer 315. Rather, the email server 340 operates to remove such common components when appropriate. However, as mentioned above, in other illustrative embodiments, the client email application 310 itself may maintain the necessary data structures and have the appropriate logic similar to that of the email server 340 for determining whether to strip off or otherwise not include common components, such as the signature 322, before transmitting the email file 320 to the email server 340. In such an alternative embodiment, the email server 340 may not need to be modified from conventional email servers 340 with the logic for implementing the illustrative embodiment being provided in the client email applications at the sender computer 315 and the receiver computer 330. In this way, the network traffic may be greatly minimized by reducing the size of the email file 320 both in the transmission of the email file 320 from the sender computer 315 to the email server 340 and from the email server 340 to the recipient computer 330 whereas in the depicted illustrative embodiment, the reduction in network traffic is only experienced in the retransmission of the email file 325 (with the signature 322 stripped off) from the email server 340 to the receiver computer 330.

In the depicted example, the email server 340 receives the email file 320 and analyzes the email file 320 to determine if common components of the email file 320, e.g., the signature 322, should be removed, stripped off, or otherwise not included in the email file 325 that is retransmitted to the receiver computer 330. Taking the signature 322 as an example of a common component of an email file 320, in order to understand one way in which the email server 340 may determine whether to strip off the signature 322 from the email file 320 when retransmitting the email file, consider a typical signature 322 which is usually appended at the bottom of the email body, such as a Simple Mail Transfer Protocol (SMTP) field as follows:

Field Name: Body
Data Type: Rich Text
Data Length: 11084 bytes
Seq Num: 2
Dup Item ID: 0
Field Flags: SIGN SEAL
Xxxxx yyyy zzzz wwww (signature)

The content of the signature field is defined and updated through the client email application of the sender computer 315 via one or more user interfaces as previously mentioned above. Moreover, the signature field may be specified by a particular tag associated with the field, a length field to help identify the portion of the email corresponding to the signature, and/or other information that may be used to specifically identify the signature from other parts of the email file 320.

In one illustrative embodiment, the client email application associates a version identifier with the signature. Thus, for example, when the user first defines a signature, the version identifier may be set to an initial value. Thereafter, each time the user changes the signature, a new version identifier may be associated with the signature. For example, if the version identifier is an integer, the integer may be iterated to a next value when the signature is changed and stored by the user for use with subsequent email messages. Similar version identifiers may be associated with other common components in a similar manner. The version identifiers may be transmitted along with the email file 320 as part of the signature component 322, for example.

At the email server 340 the signature component 322 is extracted from the email file 320 and compared against signature information stored for the sender of the email file 320, if any, in a sender signature table 342. The sender signature table 342 stores entries containing the sender name and the associated signature version information. The sender name may be an email address or other identifier of the sender. Similar table data structures may be maintained by the email server 340 for other common components or other common component information may be stored in this same sender signature table 342 including version information.

If an entry exists for the sender in the sender signature table 342, the corresponding signature information is retrieved from the entry and compared with the signature information 322 obtained from the email file 320. If there is no signature information in the entry of the sender signature table 342, or if the version information of the signature information in the sender signature table 342 is different from the signature information 322 obtained from the email file 320, then the signature information in the sender signature table 342 is updated with the sender information 322 from the email file 320. This may involve updated the version information and furthermore, may store a copy of the signature information 322, such that if necessary, the sender signature table 342 may be used to provide the most currently used signature information 322 back to the sender computer 315 in the case that the signature information is lost or corrupted on the sender computer 315. In addition, if the signature information 322 is different from the signature information in the sender signature table 342, in one illustrative embodiment, as a result the signature information 322 may be automatically kept in the email file 320 when it is retransmitted as email file 325 to the receiver computer 330.

Alternatively, or in addition, the email server 340 may further maintain a recipient signature table 344 that maintains entries for each sender and corresponding recipients to which the sender has sent email messages. As shown in FIG. 3, the entries in the recipient signature table 344 include a sender name field, a recipient name field and a signature version field. Of course, additional fields may be included for version information of other common components as well. Rather than using the sender signature table 342 to determine whether to strip off the signature information 322 from the email file 320 when retransmitting it as email file 325, the email server 340 may compare the signature information 322 to the signature information in the recipient signature table 344 for the particular recipients identified in the email file 320 and if there is not a difference, the signature information 322 may be stripped off of the email file 320. Otherwise, if the signature information does not exist in the recipient signature table 344 for that recipient/sender pair or if the signature information 322 is different from the signature information in the entry of the recipient signature table 344, e.g., the version information for the signature 322 is different than the one stored in the recipient signature table 344, then the signature information 322 is maintained in the email file 325 that is retransmitted from the email server 340. In such a case, the email signature 322 may be used to update the entry in the recipient signature table 344.

Once the email server 340 has determined whether to include or strip off the signature information 322 from the email file 320, the email server 340 forwards the email file 320 as email file 325 to the recipient computer 330. The email file 325 may be the same email file 320 as received by the email server 340 in the case that the signature information 322 is not stripped off of the email file 320, or may be a modified version of the email file 320 in the event that the signature information 322 is stripped off of the email file 320 by the email server 340. In the case where the email server 340 strips off the signature information 322 from the email file 320, the email file 325 that is forwarded may have a bit, flag, or other identifier set, such as in header information of the file, metadata associated with the file, or the like, that identifies the fact that signature information 322 has been stripped off. The bit, flag, etc., may be part of a plurality of such identifiers, such as a bitmap or the like, having individual bits, flags, or other identifiers for a plurality of common components of email files. The email file 325 may then be transmitted or forwarded to the recipient computer 330 either through a push operation, e.g., the email server 340 sends the email file 325 without requiring a request from the recipient computer 330, or a pull operation, e.g., the email server 340 sends the email file 325 in response to a request from an email client application 350 executing on the recipient computer 330 requesting email files from the email server 340.

The email file 325 is received by the email client application 350 executing on the recipient computer 330. The email client application 350 analyzes the received email file 325 and determines whether the email file 325 includes signature information or not. This may be done by analyzing header information and looking at the identifiers of the common components of email files to determine which, if any, common components have been stripped off or not. Alternatively, the email file 325 may be analyzed in a similar manner as done by the email server 340 to identify a portion of the email file 325 that corresponds to a signature field, if one exists. Any mechanism for identifying whether a signature is present in the email file 325 or not may be used without departing from the spirit and scope of the illustrative embodiments.

If the email file 325 contains signature information 322, the version identifier of the signature information 322 is compared to version information for that latest previously received email signature received by the recipient computer 330 from the same sender. Specifically, the email client application 350 on the recipient computer 330 maintains a signature archive 360 that associates a sender identifier with a most recent versions of signature information received from that sender. The signature information in the signature archive 360 may include the signature itself and an associated version identifier, as received from the sender computer 315 via the email server 340. The signature information 322 in the received email file 325 is compared against the signature information stored in the signature archive 360 for the particular sender identified in the email file 325, i.e. the sender associated with sender computer 315 in the depicted example, and if there is a difference, or if there is no signature information in the signature archive 360, the later version signature information is utilized when outputting the email file 325 for viewing by the user of the recipient computer 330. Moreover, the later version signature information is used to update the signature archive 360 so that the signature archive 360 has the most up-to-date signature information being used by the sender.

If the email file 325 does not include signature information 322, then the email client application 350 on the recipient computer 330 retrieves the latest signature information it has received from that sender from the signature archive 360 if a corresponding entry in the signature archive 360 exists. That is, a lookup operation is performed in the signature archive 360 based on the sender identifier to find corresponding signature information. The signature information is then extracted from the signature archive 360, if it exists, and is used to display the email file 325 to the user of the recipient computer 330. It should be noted that the retrieval and usage of signature information from the signature archive 360 in this case does not result in the email file 325 being permanently modified by including the signature information in the email file 325. To the contrary, the retrieval of such signature information is for display purposes only and does not result in an increase in the size of the email file 325. This allows the email file 325 to remain at a minimized size and thus, reduces the storage needed to store the email file 325. Furthermore, signature information need only be stored once at the recipient computer 330 rather than multiple times with each email received from the sender.

It should be noted that there may be instances where the local signature archive 360 of the recipient computer 330 may become corrupted, may be deleted in error, or may otherwise not be useable by the recipient computer 330 for some reason. In such a situation, the email server 340 may be used as a backup of the signature archive 360 with the email client application 350 at the recipient computer 330 being configured such that it may request that signature information associated with the recipient be transmitted from the email server 340 to the recipient computer 330 such that the signature archive 360 may be rebuilt. In such a case, the email server 340 may search the recipient table 344 of the email server for the recipient identifier of a recipient associated with the recipient computer 330, as specified in the request from the recipient computer 330, and may then retrieve and transmit the entries, corresponding to the recipient, to the recipient computer 330. Alternatively, the version information for the signatures in the recipient table 344 for this recipient may be set to a lowest version so that signatures in subsequent email files 320 will then be transmitted through to the recipient computer 330, e.g., included in the email file 325, so that the signature archive 360 is again built up.

With the mechanisms of the illustrative embodiments the size of email files is minimized by stripping off common components at either the sender computer or an email server and then reinserting them at the recipient computer when outputting the email file. This reduces the size of the email file both for network traffic purposes and for storage purposes. The amount of network traffic and storage savings depends on the sizes of the common components. For example, with signatures that are all text, the size savings may be relatively small. However, for signatures that incorporate logos or other graphics, the size savings may be substantially, especially when aggregated over all of the email files that a sender may send to particular recipients over a period of time.

As mentioned repeatedly above, it should be kept in mind that the signature information is only one example of a common component of an email file that may be stripped off or otherwise not included in a modified email file using the mechanisms of the illustrative embodiments and other common components may alternatively, or in addition, be removed in a similar manner. For example, stationery information may be another type of common component that may be removed from email files in the manner described above.

Figure 4:
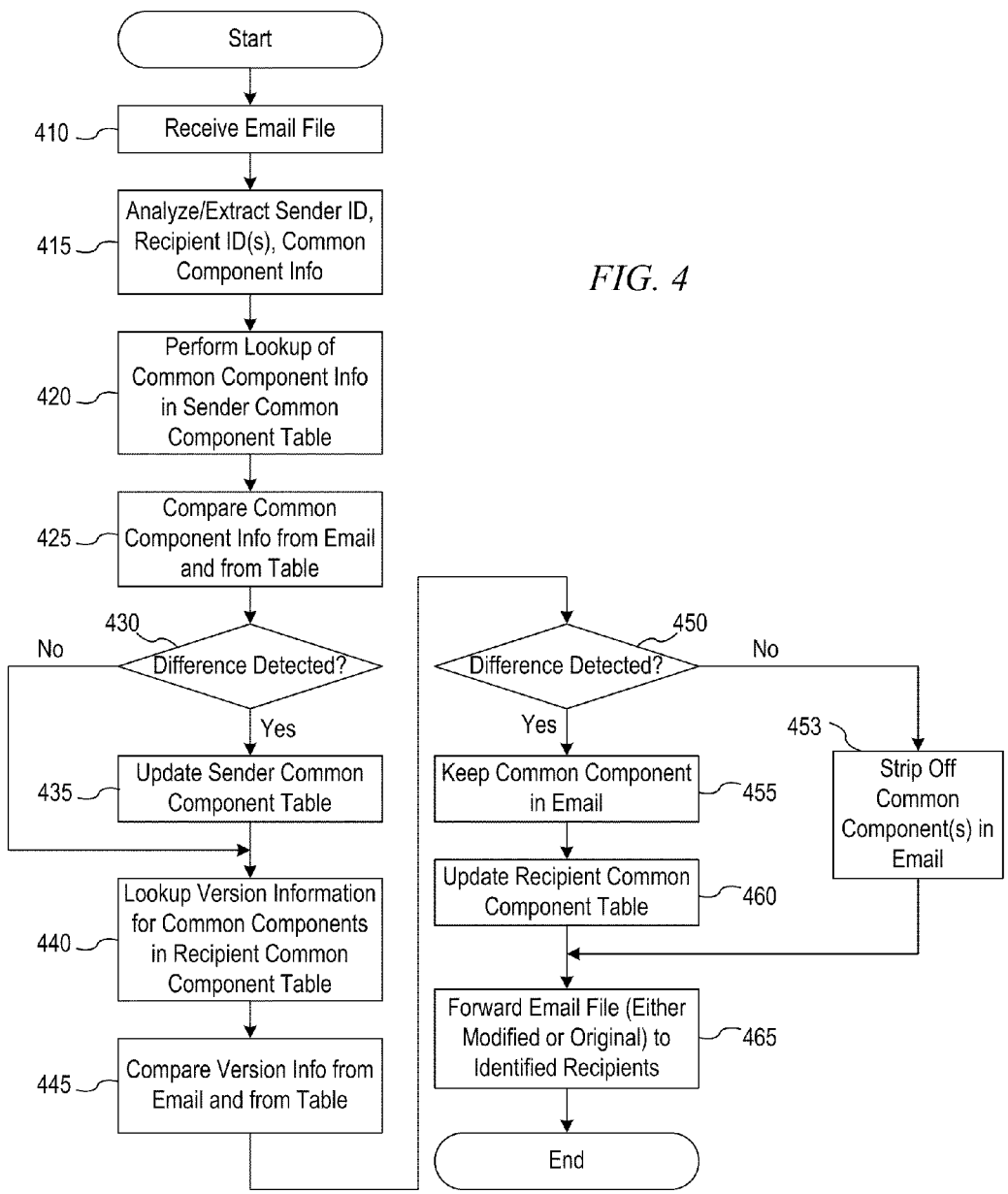
FIG. 4 is flowchart outlining an example operation of an email server in accordance with one illustrative embodiment.

FIG. 4 is flowchart outlining an example operation of an email server in accordance with one illustrative embodiment. It should be noted that, while FIG. 4 is described with regard to one illustrative embodiment in which the operation is performed by an email server, the operation shown in FIG. 4 may also be implemented at a sender computer in another illustrative embodiment. It should also be noted that where the following description assumes that common component information is identified in a lookup operation, it is possible that the common component information may not actually be present in the various tables or data structures. In such a case, the lack of common component information in the tables or data structures will result in a difference being detected when performing a comparison and, as a result, the particular tables or data structures will be appropriately updated and common component information forwarded with the email file.

As shown in FIG. 4, the operation starts with the email server receiving an email file from a sender computer (step 410). The email file is analyzed to extract the sender identifier, one or more recipient identifiers, and the common component information present in the email file (step 415). A lookup of common component information in a sender common component table, e.g., a sender signature table 342, is performed based on the sender identifier extracted from the email file (step 420). The common component information retrieved from the sender common component table is compared to the common component information extracted from the email file (step 425). If there is a difference (step 430), the sender common component table is updated to include the common component information extracted from the email file (step 435).

Thereafter, or if there is not a difference, a lookup of version information for the common components, and for the particular recipient identifiers, is performed in a recipient common component table (step 440). The version information retrieved from the recipient common component table is compared to version information for the common components included in the email file that was received (step 445). If there is a difference (step 450), then the common component is kept in the forwarded email file (step 455) and the recipient common component table is updated with the common component information and version information extracted from the received email file (step 460). If there is no difference detected (step 450) the common components are stripped off the email file (step 453). The email file, either modified or not by the removal of common components, is forwarded to the recipients identified in the received email file (step 465). Such forwarding can be done through either a push or pull operation as previously discussed. The operation then terminates. It should be appreciated that the operation outlined above may be performed for one or more common components in the email file and thus, many of the steps may be repeated for each common component in the one or more common components. Such steps may be performed in parallel with each other as the common components are checked and stripped if appropriate.

Figure 5:
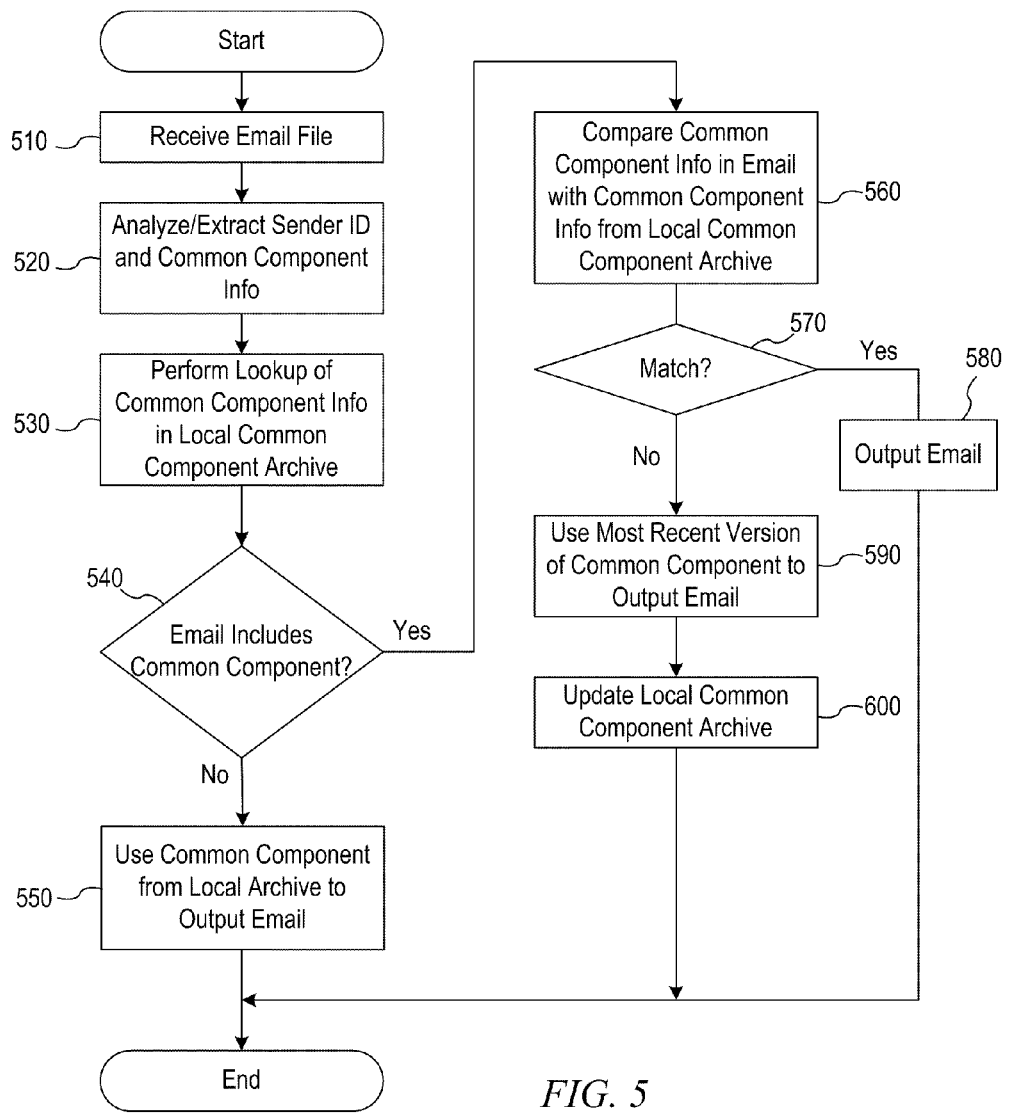
FIG. 5 is a flowchart outlining an example operation of a recipient computer's email client application in accordance with one illustrative embodiment.

FIG. 5 is a flowchart outlining an example operation of a recipient computer's email client application in accordance with one illustrative embodiment. As shown in FIG. 5, the operation starts with receiving an email file from an email server (step 510). The email file is analyzed to extract the sender identifier and common component information if any (step 520). A lookup operation of common component information for the sender identifier is performed in a local common component archive (step 530).

A determination is made as to whether the email file includes the common component (step 540). If the email file does not include the common component, and common component information was retrieved as part of the lookup operation in the local common component archive, then the common component information retrieved from the local common component archive is used along with the email file to output the email message on the recipient computer (step 550). If the email file does include the common component, then the common component information extracted from the email file is compared against the common component information retrieved from the local common component archive (step 560). If they match (step 570), then the email file is simply output on the recipient computer (step 580). If they do not match, then the most recent version of the common component information is identified and used to output the email file on the recipient computer (step 590). In such a case, the most recent version of the common component information is further used to update the local common component archive (step 600). The operation then terminates. Again, it should be appreciated that the operation outlined above may be performed for one or more common components in the email file and thus, many of the steps may be repeated for each common component in the one or more common components. Such steps may be performed in parallel with each other as the common components are checked. Also it should be outlined that once the common components are detected as included (step 540), the steps 560 and 570 can also be skipped to go to step 590 directly.

Thus, the illustrative embodiments provide mechanisms for reducing the transmission and storage sizes of email files. This greatly enhances the operation of computer networks in an era of electronic communication by reducing the amount of bandwidth taken up by such email files and reducing the amount of storage space needed to maintain email files on computing devices.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for processing an electronic mail (email) file, comprising:

receiving the email file, the email file specifying a sender identifier of a sender of the email file, a recipient identifier of a recipient of the email file, and common component information for a common component included in the email file, the common component being a component of the email file that is common amongst a plurality of email files sent from the sender;

identifying the common component of the email file;

determining whether to remove the common component from the email file before forwarding the email file to the recipient based on at least the sender identifier;

removing the common component from the email file to thereby generate a modified email file in response to a determination to remove the common component; and forwarding one of the email file or the modified email file to a recipient computer associated with the recipient identifier in response to results of the determination whether to remove the common component, wherein the modified email file is forwarded to the recipient computer in response to a determination that a common component is to be removed from the email file before forward, and the email file is forwarded to the recipient computer in response to a determination that a common component is not to be removed from the email file before forwarding, wherein the common component is a common portion of a body of the email file that is reused amongst email files in the plurality of email files sent from the sender.

2. The method of claim 1, wherein the common component is a signature of a sender of the email file.

3. The method of claim 1, wherein the data processing system is client computer associated with the sender of the email file, and wherein the email file is received in an email client application executing on the client computer from user input to the client computer.

4. The method of claim 1, wherein the data processing system is an email server.

5. The method of claim 1, wherein determining whether to remove the common component from the email file before forwarding the email file is further performed based on the recipient identifier, and wherein if the common component has been previously sent from the sender associated with the sender identifier to the recipient associated with the recipient identifier, then the common component is removed from the email file to thereby generate the modified email file.

6. The method of claim 5, wherein determining whether to remove the common component is performed based on a history data structure that stores information regarding which recipient identifiers the sender associated with the sender identifier has sent email files to in the past and identifiers of the common components that were present in the previously sent email files to those recipient identifiers.

7. The method of claim 6, wherein the identifiers of the common components are one of version numbers or hash values resulting from the application of a hash function on the contents of the common components.

8. The method of claim 6, further comprising:
updating the history data structure in response to a determination to not remove the common component from the email file.

9. The method of claim 1, further comprising:
including, in the modified email file, an indicator that indicates that a common component has been removed from the email file in response to removing the common component from the email file to generate the modified email file.

10. The method of claim 9, wherein the indicator is a bitmap, and wherein each bit in the bitmap corresponds to a different possible common component of the email file.

11. The method of claim 1, further comprising:
receiving an email data structure at a recipient computing device, the email data structure corresponding to one of the email file or the modified email file;
determining, at the recipient computing device, whether a common component has been stripped off of the email data structure;
retrieving a locally stored version of the common component from a local common component archive; and
inserting the locally stored version of the common component into the email data structure, in response to a determination that the common component has been stripped off, prior to outputting the email data structure at the recipient computing device.

12. The method of claim 11, further comprising:
storing a local copy of the common component of the email data structure in the local common component archive of the recipient computing device in response to a determination that the common component has not been stripped off of the email data structure, wherein the local copy of the common component is stored in the local common component archive in association with the sender identifier.

13. A computer program product comprising a computer recordable medium having a non-transitory computer readable program recorded thereon, wherein the computer readable program, when executed on a computing device, causes the computing device to:
receive an electronic mail (email) file, the email file specifying a sender identifier of a sender of the email file, a recipient identifier of a recipient of the email file, and common component information for a common component included in the email file, the common component being a component of the email file that is common amongst a plurality of email files sent from the sender;
identify the common component of the email file;
determine whether to remove the common component from the email file before forwarding the email file to the recipient based on at least the sender identifier;
remove the common component from the email file to thereby generate a modified email file in response to a determination to remove the common component; and
forward one of the email file or the modified email file to a recipient computer associated with the recipient identifier in response to results of the determination whether to remove the common component, wherein the modified email file is forwarded to the recipient computer in response to a determination that a common component is to be removed from the email file before forward, and the email file is forwarded to the recipient computer in response to a determination that a common component is not to be removed from the email file before forwarding, and wherein the common component is a common portion of a body of the email file that is reused amongst email files in the plurality of email files sent from the sender.

14. The computer program product of claim 13, wherein the data processing system is client computer associated with the sender of the email file, and wherein the email file is received in an email client application executing on the client computer from user input to the client computer.

15. The computer program product of claim 13, wherein determining whether to remove the common component from the email file before forwarding the email file is further performed based on the recipient identifier, and wherein if the common component has been previously sent from the sender associated with the sender identifier to the recipient associated with the recipient identifier, then the common component is removed from the email file to thereby generate the modified email file.

16. The computer program product of claim 15, wherein determining whether to remove the common component is performed based on a history data structure that stores information regarding which recipient identifiers the sender associated with the sender identifier has sent email files to in the past and identifiers of the common components that were present in the previously sent email files to those recipient identifiers.

17. The computer program product of claim 16, further comprising:

updating the history data structure in response to a determination to not remove the common component from the email file.

18. The computer program product of claim 13, further comprising:
including, in the modified email file, an indicator that indicates that a common component has been removed from the email file in response to removing the common component from the email file to generate the modified email file.

19. The computer program product of claim 13, further comprising:
receiving an email data structure at a recipient computing device, the email data structure corresponding to one of the email file or the modified email file;
determining, at the recipient computing device, whether a common component has been stripped off of the email data structure;
retrieving a locally stored version of the common component from a local common component archive;
inserting the locally stored version of the common component into the email data structure, in response to a determination that the common component has been stripped off, prior to outputting the email data structure at the recipient computing device; and
storing a local copy of the common component of the email data structure in the local common component archive of the recipient computing device in response to a determination that the common component has not been stripped off of the email data structure, wherein the local copy of the common component is stored in the local common component archive in association with the sender identifier.

20. An apparatus, comprising:
a processor; and
a memory coupled to the processor, wherein the memory comprises instructions which, when executed by the processor, cause the processor to:
receive an electronic mail (email) file, the email file specifying a sender identifier of a sender of the email file, a recipient identifier of a recipient of the email file, and common component information for a common component included in the email file, the common component being a component of the email file that is common amongst a plurality of email files sent from the sender;
identify the common component of the email file;
determine whether to remove the common component from the email file before forwarding the email file to the recipient based on at least the sender identifier;
remove the common component from the email file to thereby generate a modified email file in response to a determination to remove the common component; and
forward one of the email file or the modified email file to a recipient computer associated with the recipient identifier in response to results of the determination whether to remove the common component, wherein the modified email file is forwarded to the recipient computer in response to a determination that a common component is to be removed from the email file before forward, and the email file is forwarded to the recipient computer in response to a determination that a common component is not to be removed from the email file before forwarding, and wherein the common component is a common portion of a body of the email file that is reused amongst email files in the plurality of email files sent from the sender.

* * * * *